United States Patent
Soures et al.

(10) Patent No.: US 12,090,768 B2
(45) Date of Patent: Sep. 17, 2024

(54) MARKING PROCESS SPEED STABILIZATION IN A DIGITAL PRINTER

(71) Applicant: Xerox Corporation, Norwalk, CT (US)

(72) Inventors: Michael N. Soures, Webster, NY (US); Bruce H. Smith, Webster, NY (US); James D. Van Bortel, Rochester, NY (US); Ellery F. Wong, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 104 days.

(21) Appl. No.: 17/811,430

(22) Filed: Jul. 8, 2022

(65) Prior Publication Data

US 2024/0010016 A1 Jan. 11, 2024

(51) Int. Cl.
| | | |
|---|---|---|
| *B41J 29/393* | (2006.01) | |
| *B41J 2/045* | (2006.01) | |
| *B41J 13/00* | (2006.01) | |
| *G03G 15/00* | (2006.01) | |
| *G06T 7/00* | (2017.01) | |
| *G03G 15/16* | (2006.01) | |

(52) U.S. Cl.
CPC ......... *B41J 29/393* (2013.01); *B41J 2/04558* (2013.01); *B41J 13/0027* (2013.01); *G03G 15/5041* (2013.01); *G03G 15/505* (2013.01); *G03G 15/5058* (2013.01); *G03G 15/55* (2013.01); *G06T 7/0004* (2013.01); *G03G 15/1615* (2013.01); *G03G 2215/00037* (2013.01); *G06T 2207/30144* (2013.01)

(58) Field of Classification Search
None
See application file for complete search history.

(56) References Cited

U.S. PATENT DOCUMENTS

| | | | |
|---|---|---|---|
| 5,181,128 A * | 1/1993 | Fukatsu | H04N 1/191 358/487 |
| 5,530,642 A | 6/1996 | Lofthus et al. | |
| 6,181,356 B1 * | 1/2001 | Ohnishi | H04N 1/00031 347/116 |
| 7,857,414 B2 * | 12/2010 | Eun | B41J 11/42 347/19 |
| 8,208,183 B2 | 6/2012 | Wu et al. | |
| 8,469,476 B2 | 6/2013 | Mandel et al. | |
| 8,599,435 B2 | 12/2013 | Paul et al. | |
| 8,767,220 B2 | 7/2014 | Hunter et al. | |
| 2002/0114642 A1 * | 8/2002 | Rimai | B65H 29/12 399/167 |

(Continued)

*Primary Examiner* — Akwasi M Sarpong
*Assistant Examiner* — Pawan Dhingra
(74) *Attorney, Agent, or Firm* — Simpson & Simpson, PLLC

(57) ABSTRACT

A method of stabilizing a marking process speed in a printing system, the printing system including a vacuum transport belt and at least one sheet onto which marking material is directly applied to print sheets, the method including printing an image on the sheet, receiving, from a sensor, data related to the image, determining, based on the data, at least one actual dimension of the image, determining if the at least one actual dimension of the image is equal to a target dimension of the image, and if the at least one actual dimension is not equal to the target dimension, adjusting one or more components of the printing system.

24 Claims, 8 Drawing Sheets

(56) References Cited

U.S. PATENT DOCUMENTS

| | | | |
|---|---|---|---|
| 2010/0080596 A1* | 4/2010 | Gross | G03G 15/5058 |
| | | | 399/66 |
| 2010/0135702 A1* | 6/2010 | Calamita | G03G 15/5058 |
| | | | 399/301 |
| 2018/0246435 A1* | 8/2018 | Ebe | G03G 13/01 |
| 2021/0023851 A1* | 1/2021 | Anan | B41J 2/04501 |
| 2022/0253011 A1* | 8/2022 | Izumi | G03G 15/5058 |
| 2022/0286576 A1* | 9/2022 | Ishitsuka | H04N 1/32625 |
| 2023/0300279 A1* | 9/2023 | Shinnae | H04N 1/6033 |
| | | | 358/518 |

* cited by examiner

MARKING PROCESS SPEED STABILIZATION IN A DIGITAL PRINTER

FIELD

The present disclosure relates to the field of printing systems, and more particularly, to a system for ongoing measurement of process direction and cross process direction lines to automate the process speed target adjustment across system noises.

BACKGROUND

Current printing systems require some level of periodic setups to achieve the correct process speed, that is, speed of a belt and/or sheet in the process direction. Machine noise (e.g., part wear, thermal expansion, contamination on rollers, part aging, etc.) could invalidate a previous setup if the process speeds have shifted enough to induce magnification or timing errors due to drive train noises. For example, the drive roller diameter can wear down and cause slipping, the belt can shrink, the belt can stretch and cause slipping, marking material can accrue on a roller and thus cause the roller diameter to increase or become non-constant, etc. These system noises may result in magnification errors (i.e., size difference in printed image), timing errors, slipping, a loss in speed between the belt and the sheet (i.e., the belt moves faster than the sheet or vice versa), etc. Drive train noises are considered variables in the printing system that are uncontrollable. In current printing systems, small changes in process speed due to thermal variation in the ambient temperature and part wear/aging, do not get accounted for properly. To fix these problems, an operator must run additional setups on paper until the error sources are eliminated (i.e., a trial by error strategy). As may be appreciated, as opposed to wholly random events that can be difficult to account for and address, the above-described system and machine noises are generally attributed to the continued use of the system or machine, and wear and tear of certain system or machine components that can accrue over time—which wear and tear, for example, is generally known, progressive in nature, and predictable.

As such, there is a long felt need for a process speed stabilization system that automates process speed target adjustments across noises and eliminates the need for an operator to determine when to perform another process speed setup using an image on paper (IOP) setup routine.

SUMMARY

According to aspects illustrated herein, there is provided a method of stabilizing a marking process speed in a printing system, the printing system including a surface from which marking material is transferred to print sheets, comprising printing an image on the surface, receiving, from a sensor, data related to the image, determining, based on the data, at least one actual dimension of the image, determining if the at least one actual dimension of the image is equal to a target dimension of the image, and if the at least one actual dimension is not equal to the target dimension, adjusting one or more components of the printing system.

In some embodiments, the step of printing the image on the surface comprises printing the image directly on a belt. In some embodiments, the step of printing the image on the surface comprises printing the image directly on a drum. In some embodiments, the step of printing the image on the surface comprises printing one or more lines on the surface. In some embodiments, the one or more lines are arranged parallel to a process direction of the printing system. In some embodiments, the one or more lines are arranged parallel to a cross process direction of the printing system, perpendicular to the process direction. In some embodiments, the step of determining, based on the data, the at least one actual dimension of the image comprises determining an actual frequency of the one or more lines passing the sensor. In some embodiments, the step of determining if the at least one actual dimension of the image is equal to the target dimension of the image comprises determining if the actual frequency is equal to a target frequency.

In some embodiments, the step of determining, based on the data, the at least one actual dimension of the image comprises determining an actual length of the one or more lines passing the sensor. In some embodiments, the step of determining if the at least one actual dimension of the image is equal to the target dimension of the image comprises determining if the actual length is equal to a target length. In some embodiments, the sensor comprises at least one of a black toner area coverage (BTAC) sensor, an electronic toner area coverage (ETAC) sensor, and a camera. In some embodiments, the step of adjusting the one or more components of the printing system comprises changing, by an engine controller, a speed of a drive roller of the printing system. In some embodiments, the step of adjusting the one or more components of the printing system comprises changing, by a print controller, a discharge time of a developer of the printing system. In some embodiments, the step of determining, based on the data, the at least one actual dimension of the image comprises locating at least two points in the image, and determining an actual frequency or an actual distance between the at least two points.

According to aspects illustrated herein, there is provided a method of stabilizing a marking process speed in a printing system, the printing system including a vacuum transport belt and at least one sheet onto which marking material is directly applied to print sheets, the method comprising printing an image on the sheet, receiving, from a sensor, data related to the image, determining, based on the data, at least one actual dimension of the image, determining if the at least one actual dimension of the image is equal to a target dimension of the image, and if the at least one actual dimension is not equal to the target dimension, adjusting one or more components of the printing system.

In some embodiments, the step of printing the image on the sheet comprises printing one or more lines on the sheet. In some embodiments, the one or more lines are arranged parallel to a process direction of the printing system. In some embodiments, the one or more lines are arranged parallel to a cross process direction of the printing system, perpendicular to the process direction. In some embodiments, the step of determining, based on the data, the at least one actual dimension of the image comprises determining an actual frequency of the one or more lines passing the sensor. In some embodiments, the step of determining if the at least one actual dimension of the image is equal to the target dimension of the image comprises determining if the actual frequency is equal to a target frequency.

In some embodiments, the step of determining, based on the data, the at least one actual dimension of the image comprises determining an actual length of the one or more lines passing the sensor. In some embodiments, the step of determining if the at least one actual dimension of the image is equal to the target dimension of the image comprises determining if the actual length is equal to a target length. In some embodiments, the sensor comprises an inline imaging module (IIM). In some embodiments, the step of adjusting the one or more components of the printing system comprises changing, by an engine controller, a speed of a drive roller of the printing system. In some embodiments, the step of adjusting the one or more components of the printing system comprises changing, by a print controller, an actuator time of one or more print heads of the printing system. In some embodiments, the step of determining, based on the data, the at least one actual dimension of the image comprises locating at least two points in the image, and determining an actual frequency or an actual distance between the at least two points.

The present disclosure comprises a method for automatic and periodic stabilization of marker process speeds in electrophotographic (EP) or inkjet printers. The method uses diagnostic images such as process direction lines, cross process line frequencies, etc., to be run periodically. The physical length of the line or the spacing between lines will be measured using an inline sensor.

For example, in EP printing systems, a black toner area coverage (BTAC) sensor, an electronic toner area coverage (ETAC) sensor, or a camera measures the physical length of the line or spacing between the lines on the photoreceptor or intermediate belt and compares it against the raster output scanner (ROS)/light emitting diode (LED), or laser, discharge time to determine actual process direction speed and carry out adjustments (adjusting the speed of the drive roller).

In inkjet printing systems, a inline imaging module (IIM) (i.e., an image capturing device such as a camera, imaging array, scanner, etc.) measures the physical length of the line or spacing between the lines and compares it against printhead actuator time to determine actual process direction speed and carry out adjustments.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
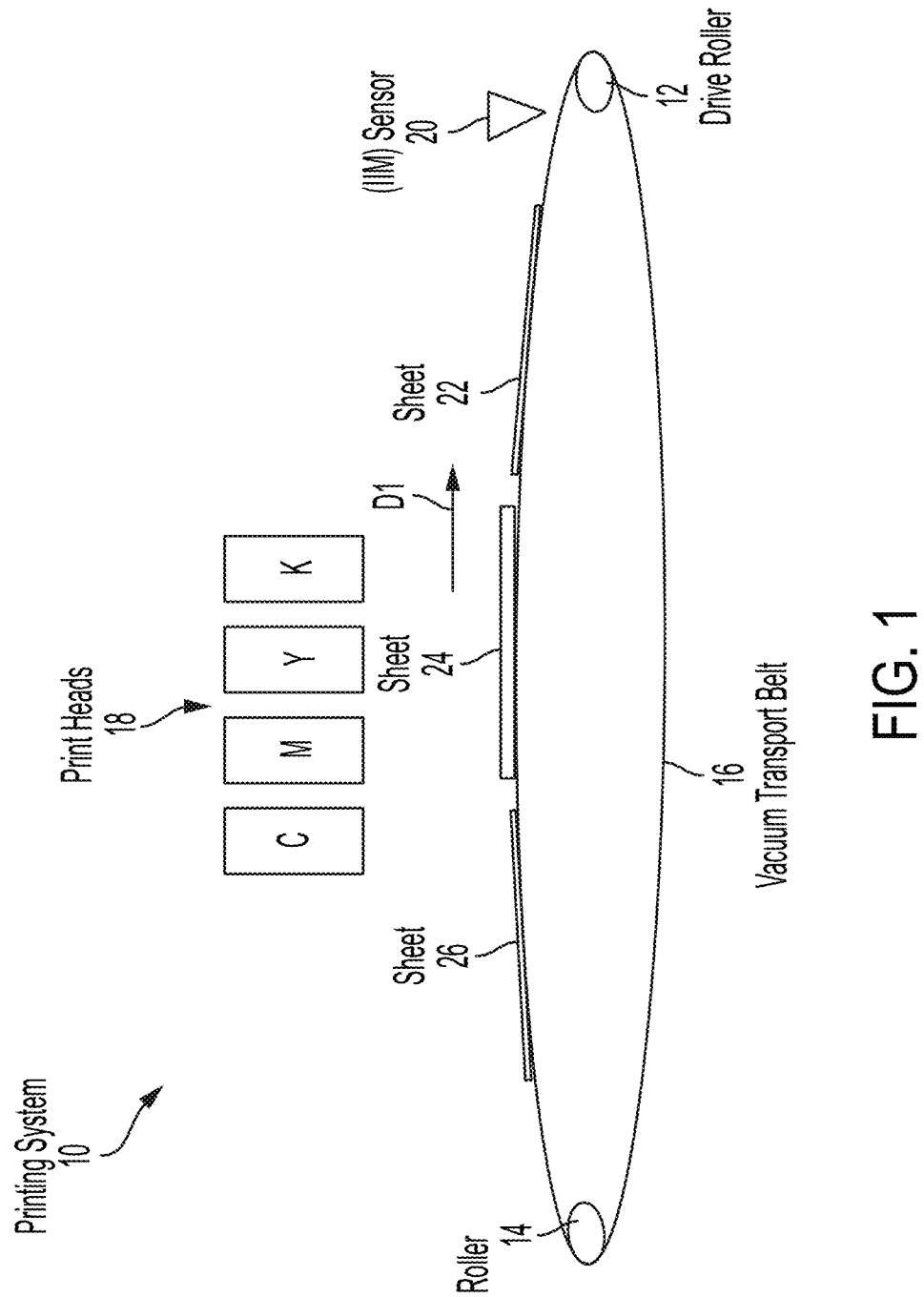
FIG. 1 is a schematic view of a printing system.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "of" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive of" arrangement. For example, an "exclusive of" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

"Printer," "printer system," "printing system," "printer device," "printing device," and "multi-functional device (MFD)" as used herein encompass any apparatus, such as a digital copier, bookmaking machine, facsimile machine, multi-function machine, etc., which performs a print outputting function for any purpose.

As used herein, "sheet," "web," "substrate," "printable substrate," and "media" refer to, for example, paper, transparencies, parchment, film, fabric, plastic, photo-finishing papers, or other coated or non-coated substrate media in the form of a web upon which information or markings can be visualized and/or reproduced. By specialty sheet it is meant a sheet which includes a card, label, sticker, pressure seal envelopes, mailers, or other element that is thicker than the substrate on or in which it resides.

"Printed sheet" as used herein is a sheet on which an image is printed as part of the print job.

As used herein, "process direction" is intended to mean the direction of media transport through a printer or copier, while "cross process direction" is intended to mean the perpendicular to the direction of media transport through a printer or copier.

As used herein, dry marking material refers to dry marking material particles used in xerography or electrophotography printing systems such as toner. Liquid marking material refers to a liquid ink used in ink jet printing systems.

Adverting now to the figures, FIG. 1 is a schematic view of printing system 10. Printing system 10 is an ink jet printing system that applies liquid marking material directly to a sheet to form an image. Printing system 10 generally comprises drive roller 12, roller or idler roller or drive roller 14, vacuum transport belt 16, one or more print heads 18, and sensor 20. Drive roller 12 and roller 14 displace vacuum transport belt 16 in process direction D1. As is known in the art, vacuum transport belt 16 comprises a plurality of holes therein through which vacuum is supplied to hold sheets thereto throughout the printing system. For example, and as shown, sheets 22, 24, and 26 are carried along vacuum transport belt 16 in process direction D1.

Print heads 18 apply liquid marking material directly to sheets 22, 24, 26 to form images thereon. The sheets may be printed sheets or diagnostic sheets. For example, and as previously described, a printed sheet is a sheet on which an image is printed as part of the print job. A diagnostic sheet is a sheet on which a diagnostic image, not part of the print job, is printed in order to detect errors in the printing system. For the purposes of this disclosure, sheets 22 and 26 are printed sheets and sheet 24 is a diagnostic sheet. Sensor 20 is arranged proximate to vacuum transport belt 16 aft of print heads 18.

Sensor 20 is operatively arranged to capture data of the various images on the various sheets and communicate such data, for example, to a computing device or process speed stabilization program 130. In some embodiments, sensor 20 may comprise any device suitable for capturing an image of a sheet passing thereby, for example, a camera, imaging array, scanner (e.g., an inline imaging module (IIM)), etc. In some embodiments, an IIM is used wherein the IIM comprises a scan bar or linear array that spans the entire cross process direction D2 at 300 dots per inch (dpi). The use of a IIM provides a high definition image of a sheet moving in process direction D1 thereunder. Images captured by the IIM are then measured to determine their actual size, which is compared to the target size of the image. If the size of the actual image is larger than the size of the target image (i.e., a magnification error), this may indicate that vacuum transport belt 16 is running slower than it should (e.g., slipping, roller wear, etc.). If the size of the actual image is smaller than the size of the target image, this may indicate that belt 16 is running faster than it should (e.g., debris has accumulated on the roller increasing its diameter). Size differences between the actual image and the target image may also indicate an issue with print heads 18, for example how many pixel-size actuations of an ejector in the print head occur. If the size of the actual image is smaller than the target image, one or more ejectors may be clogged. Additionally, size differences may indicate an issue in the print head actuator time. For example, if the actual image is smaller than the target image, the print head actuator time may be too short.

Figure 2A:
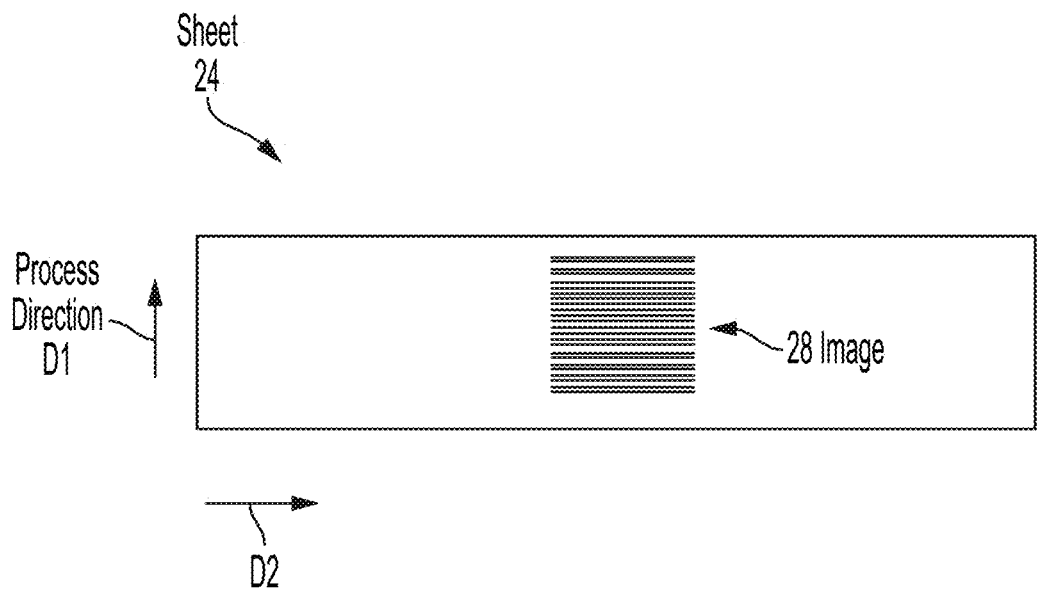
FIG. 2A is an elevational view of a sheet.

FIG. 2A is an elevational view of sheet 24. As shown, sheet 24 comprises image 28, which is a diagnostic image formed of a plurality of lines arranged parallel to cross process direction D2. In this example of a diagnostic image, the actual spacing between the plurality of lines could be measured and compared to the target spacing between the plurality of lines. In some embodiments, the plurality of lines arranged in cross process direction D2 can be used to detect, via sensor 20, how many ejectors of the print head are activated simultaneously to form the cross process lines.

Figure 2B:
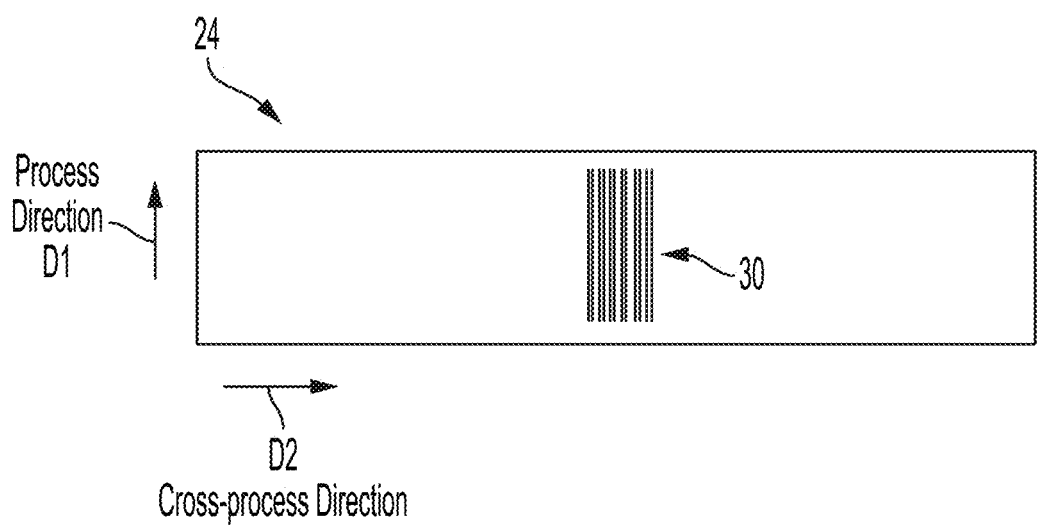
FIG. 2B is an elevational view of a sheet.

FIG. 2B is an elevational view of sheet 24. As shown, sheet 24 comprises image 30, which is a diagnostic image formed of a plurality of lines arranged parallel to process direction D1. In this example of a diagnostic image, the actual length of the plurality of the lines is measured and compared against the target length of the plurality of lines.

Moreover, it should be appreciated that in some embodiments, sensor 20 may measure the process speed of belt 16 by measuring the rate at which holes in belt 16 pass under sensor 20. However, this speed merely provide an indication as to the actual process speed of belt 16, and not the actual process speed of the sheets. In some embodiments, the speed of the sheets is compared to the speed of belt 16 to determine if there is any difference therein. It should be appreciated that, while FIG. 1 shows sensor 20 being arranged in a marker transport module, sensor 20 can capture the necessary images in other modules of the printing system, for example, the dryer, output stacker, etc., and that sensor 20 need not necessarily be arranged proximate vacuum transport belt 16.

Figure 3:
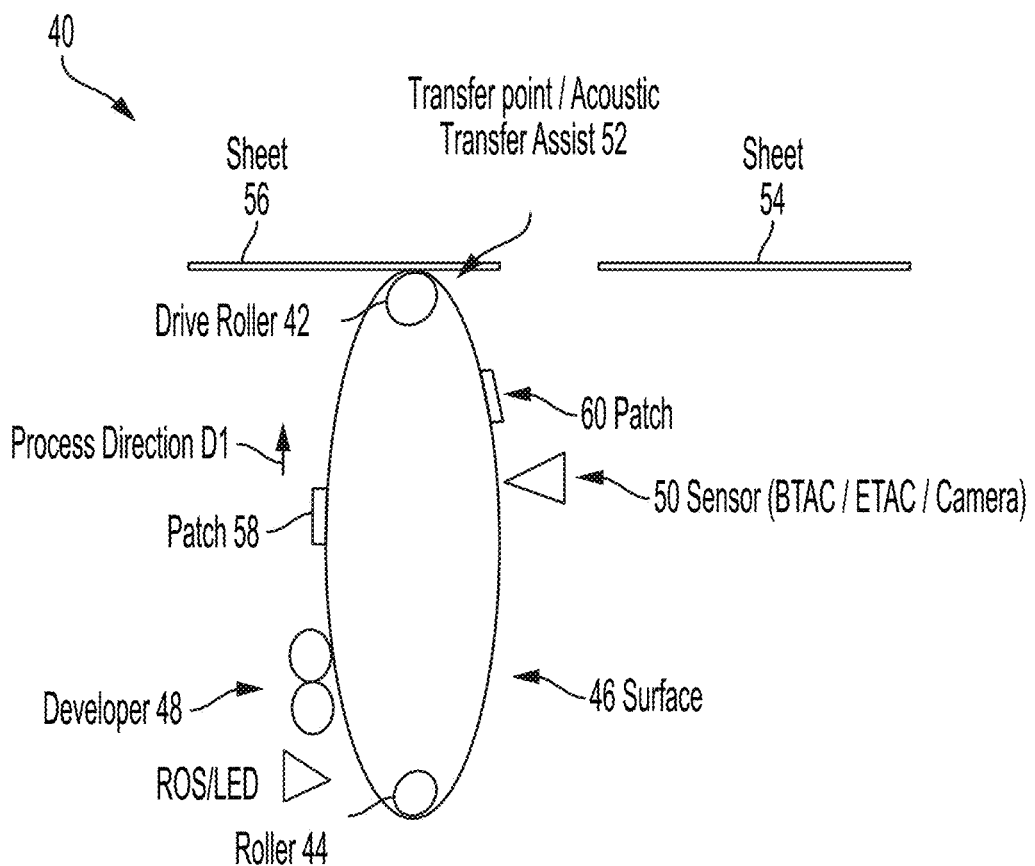
FIG. 3 is a schematic view of a printing system.

FIG. 3 is a schematic view of printing system 40. Printing system 40 is a xerographic or electrophotographic printing system that applies dry marking material (e.g., toner) directly to a surface (e.g., a belt, drum, photosensitive photosensor belt, implicitly non-photosensitive intermediate transfer belt (ITB), etc.) from which the dry marking material is transferred to a sheet to form an image (i.e., to print sheets). Printing system 40 generally comprises drive roller 42, roller or idler roller or drive roller 44, surface 46, developer 48, sensor 50, and transfer point 52.

As is known in the art, developer 48 transfers dry marking material onto surface 46 thereby creating patches or areas of dry marking material, for example, patch 58 and patch 60. Transfer point 52 is the point at which dry marking material, or the patch, is transferred from surface 46 to sheets to form printed sheets. The patches that are created to form images of a print job are transferred to the sheets. Patches that are created for diagnostic purposes, however, are not transferred to the sheets, but rather remain on surface 46 until they pass under sensor 50, for example patch 60. In some embodiments, the patches that are created to form images of a print job are not transferred to the sheets and remain on surface 46 until they pass under sensor 50. After passing under sensor 50, the non-transferred patch is removed or cleaned from surface 46 and the dry marking material is recycled.

Drive roller 42 and roller 44 displace surface 46 in process direction D1. As is known in the art, surface 46 is electrically charged such that dry marking material transferred thereto (i.e., patches) from developer 48 remains on surface 46. These patches will either be transferred to sheets 54, 56 or remain on surface 46 until passing under. Sheet 56 is shown positioned at the transfer point. Sheet 54 is shown positioned after the transfer point (i.e., a patch has already been transferred thereto to form a printed sheet). Developer 48 applies dry marking material directly to surface 46 to form patches 58, 60 thereon. As previously described, the patches can be transferred to the sheets to form printed sheets or remain on surface 46 for diagnostic purposes, namely, in order to detect errors in the printing system.

Sensor 50 is arranged proximate to surface 46 aft of transfer point 52. Sensor 50 is operatively arranged to capture data of the various images/patches on surface 46 and communicate such data, for example, to a computing device or process speed stabilization program 130. In some embodiments, sensor 50 may comprise any device suitable for capturing an image of a patch passing thereby, for example, a BTAC sensor, an ETAC sensor, a camera, etc. It should be understood that the term BTAC sensor or "densitometer" is intended to apply to any device for determining the density of print material on a surface, such as a visible light densitometer, an infrared densitometer, an electrostatic voltmeter, or any other such device which makes a physical measurement from which the density of print material may be determined. An ETAC sensor is used to monitor the digital area coverage of patches placed on surface 46. The BTAC and ETAC sensor can also measure how much marking material is in an area. The use of sensor 50, for example a camera, provides a high definition image of a patch moving in process direction D1 thereunder. Images (or patches) captured by the camera are then measured to determine their actual size, which is compared to the target size of the image. If the size of the actual image is larger than the size of the target image (i.e., a magnification error), this may indicate that surface 46 is running slower than it should (e.g., slipping, roller wear, etc.). If the size of the actual image is smaller than the size of the target image, this may indicate that surface 46 is running faster than it should (e.g., debris has accumulated on the roller increasing its diameter). Size differences between the actual image and the target image may also indicate an issue with developer 18, for example how long the laser is on (e.g., the ROS/LED discharge time). For example, if the size of the actual image is smaller than the target image, the laser discharge time may be too short. Conversely, if the size of the actual image is larger than the target image, the laser discharge time may be too long.

Figure 4A:
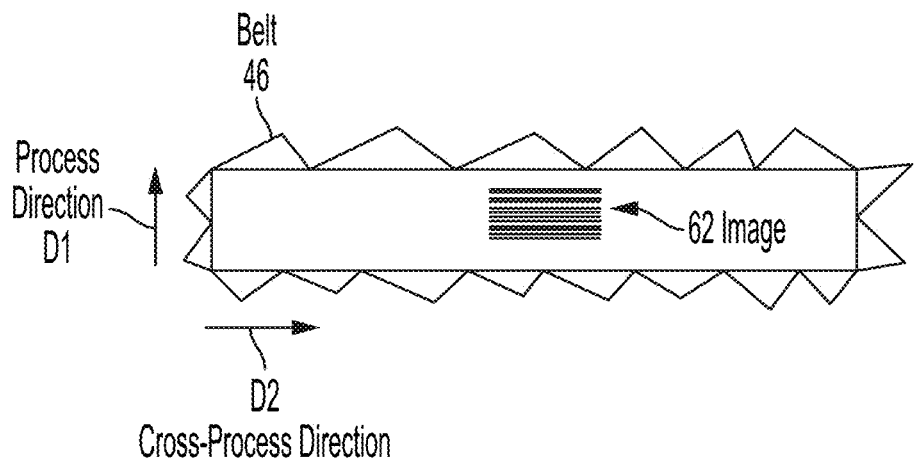
FIG. 4A is an elevational view of a belt.

FIG. 4A is an elevational view of belt 46. As shown, belt 46 comprises image or patch 62, which is a diagnostic image formed of a plurality of lines arranged parallel to cross process direction D2. In this example of a diagnostic image, the actual spacing between the plurality of lines could be measured and compared to the target spacing between the plurality of lines.

Figure 4B:
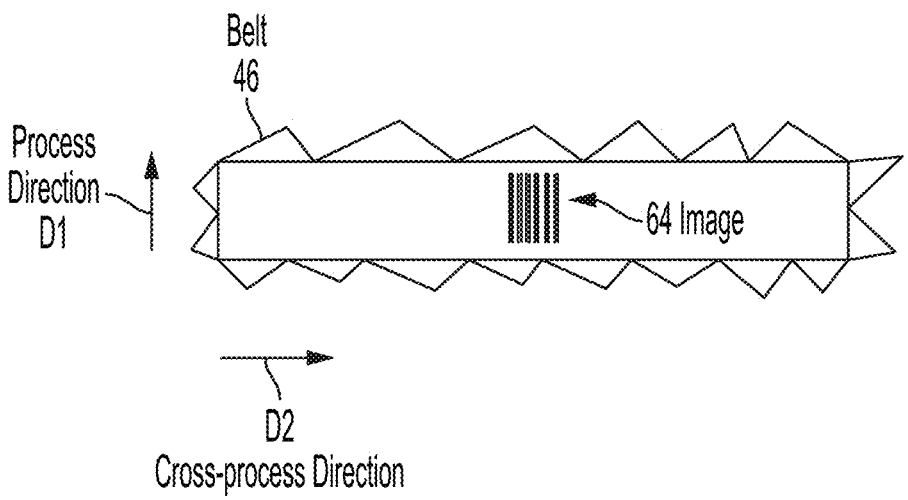
FIG. 4B is an elevational view of a belt.

FIG. 4B is an elevational view of belt 46. As shown, belt 46 comprises image or patch 64, which is a diagnostic image formed of a plurality of lines arranged parallel to process direction D1. In this example of a diagnostic image, the actual length of the plurality of the lines is measured and compared against the target length of the plurality of lines.

Figure 5:
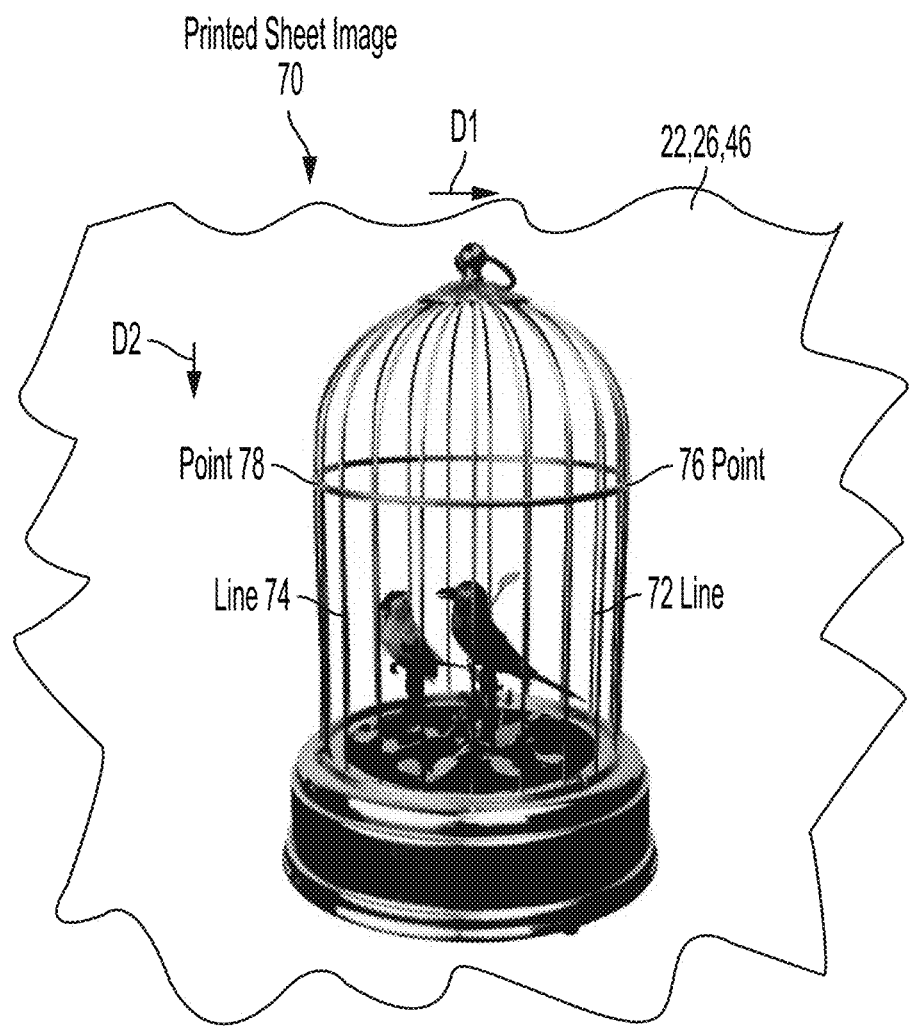
FIG. 5 is an elevational view of a printed image.

FIG. 5 is an elevational view of printed image or patch 70. Image 70 is an example of an image of a print job, which would be formed directly onto sheet 22, 26 (i.e., in ink jet printing system 10) or surface 46 (i.e., in xerographic printing system 40). In some embodiments, the present disclosure utilizes elements of an image of the print job in order to detect errors in the system. For example, sensor 20, 50 captures printed image 70 and process speed stabilization program 130 measures the actual distance between lines 72 and 74, which extend in cross process direction D2, and compares that actual distance to the target distance. Similarly, process speed stabilization program 130 can measure the actual distance, in process direction D1, between points 76 and 78 and compare that actual distance to the target distance. Thus, process speed stabilization program 130 can use special diagnostic images to determine actual measurements or find elements (e.g., points, lines, etc.) within images of a print job to determine actual measurements. Additionally, image size can be controlled in both the process and the cross-process directions using a single image, and a pre-existing customer image, for example, such as that shown in FIG. 5, can be used for error detection purposes instead of having print test patches or test images having specific line frequencies and/or instead of having to print test sheets that end up being discarded.

Figure 6:
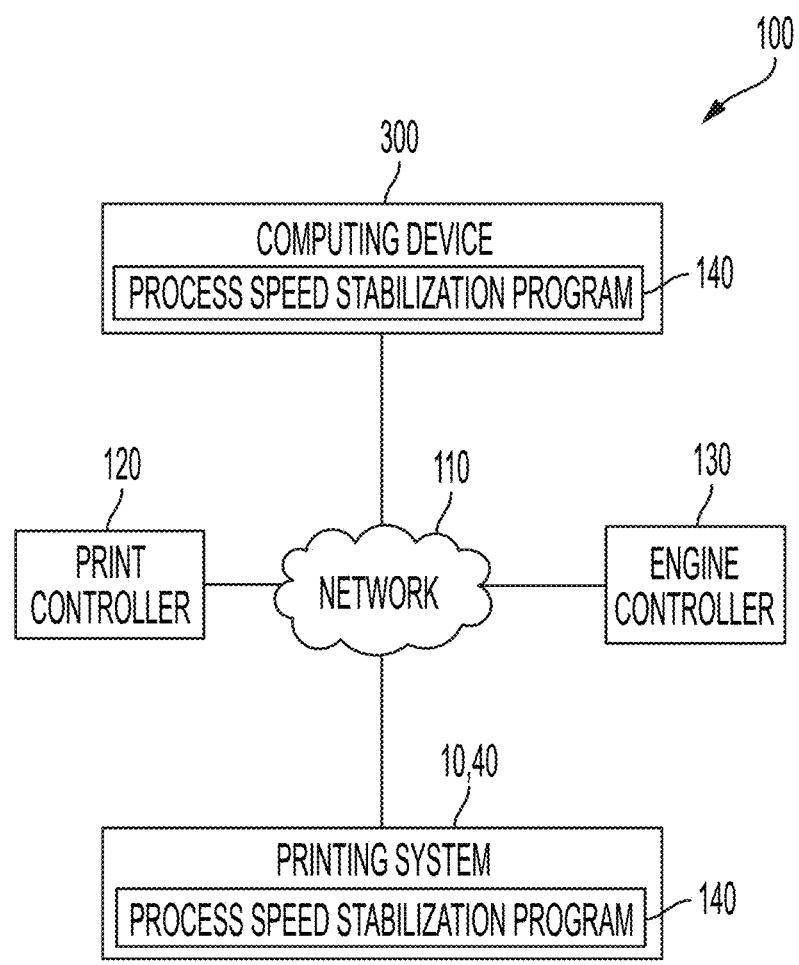
FIG. 6 is a functional block diagram illustrating an environment, in accordance with some embodiments of the present disclosure.

FIG. 6 is a functional block diagram illustrating a process speed stabilization environment, generally environment 100, in accordance with some embodiments of the present disclosure. FIG. 6 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, environment 100 includes one or more of the following connected to network 110: printing system 10, 40, print controller 120, engine controller 130, and computing device 300. In some embodiments, environment 100 may further comprise or communicate with a print server or central controller, which communicates with printing system 10, 40 and/or computing device 300 regarding print jobs.

Network 110 can be, for example, a local area network (LAN), a wide area network (WAN) such as the Internet, or a combination of the two, and can include wired, wireless, or fiber optic connections.

Computing device 300 may be a hardware device that receives images and or data of printed images on a sheet or patches on a surface, measures the actual size of the printed image or patch, compares the actual size to the target size, and adjusts the printing system using process speed stabilization or marking process speed stabilization program 140. Computing device 300 is capable of communicating with network 110, print controller 120, engine controller 130, and printing system 10, 40, and in some embodiments, a print server. In some embodiments, computing device 300 may include a computer. In some embodiments, computing device 300 may include internal and external hardware components, as depicted and described in further detail with respect to FIG. 8. In some embodiments, process speed stabilization program 140 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 8.

Process speed stabilization program 140 is primarily installed on computing device 300, although it may additionally or alternatively be installed on printing system 10, 40. Process speed stabilization program 140 is operatively arranged to obtain data of a printed image/patch related to its actual dimensions, compare the actual dimensions to the target dimensions in order to determine if the actual process speed is equal to the target process speed. For example, and as previously described, process speed stabilization program 140 may print a diagnostic image (or an image of a print job) on a sheet/surface comprising a plurality of lines (see FIGS. 2A-B and 4A-B), capture an image of the diagnostic image using sensor 20, 50, measure the actual length or spacing of the lines, and compare the actual length or spacing of the lines to the target length or spacing of the lines. If the actual length or spacing of the lines is not equal to the target length or spacing of the lines, process speed stabilization program 140 determines that the actual process speed is not equal to target process speed. To remedy this situation, process speed stabilization program 140 may communicate with engine controller 130 to increase the speed or rotational velocity of the drive roller (i.e., if the actual process speed is less than the target process speed). Likewise, process speed stabilization program 140 may communicate with print controller 120 to increase the duration that the laser is on (i.e., in electrophotographic printing systems) or the number of pixel-size actuations of an ejector in a print head (i.e., in ink-jet printing systems).

Print controller 120 is operatively arranged to control print heads 18 of printing system 10 or developer 48 of printing system 40. For example, in printing system 10, print controller 120 controls the number of pixel-size actuations of an ejector in each of print heads 18, which has a direct relationship to the actual dimensions of the printed image. In printing system 40, print controller 120 controls the length of time the laser in developer 48 is on, which has a direct relationship to the actual dimensions of the printed image/patch.

Engine controller 130 is operatively arranged to control the speed of belt 16 of printing system 10 or surface 46 of printing system 40, in process direction D1. Specifically, engine controller 130 controls the rotational velocity of drive roller 12, 42. The speed of belt 16 and surface 46 in process direction D1 has a direct relationship to the actual dimensions of the printed image. For example, in printing system 10, print heads 18 apply liquid ink to sheets at a rate based on a target speed of the sheets moving in process direction D1. Similarly, in printing system 40, developer 48 applies toner to surface 46 at a rate based on a target speed of surface 46 moving in process direction D1. Thus, any variation in the actual speed of the sheets/surface in process direction D1 from the target speed of the sheets/surface will cause errors in printed image. Likewise, any variation in the actual speed of the application of liquid ink to the sheets or toner to the surface, from the target speed, will cause errors in the printed image. Thus, it is crucial that the actual process speed be equal to the target process speed.

Figure 7:
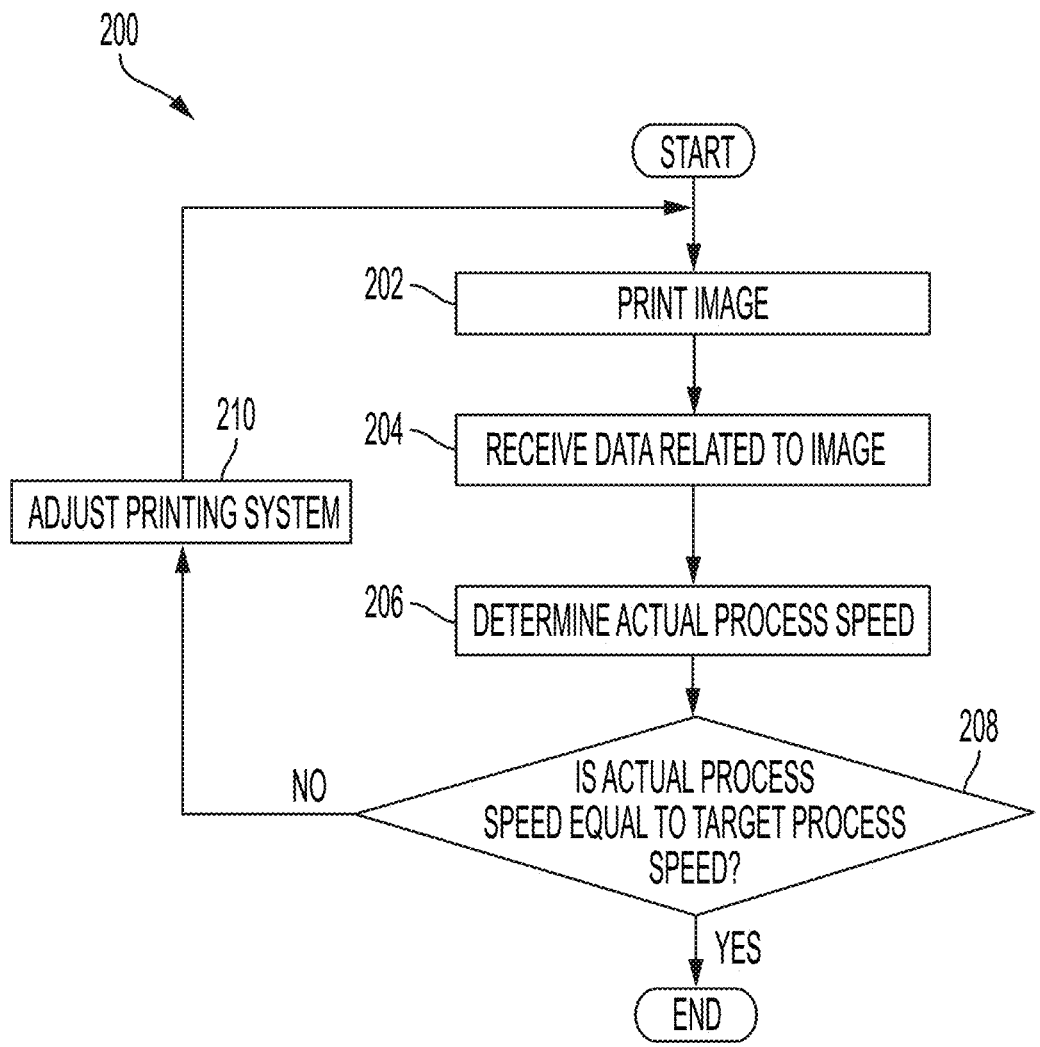
FIG. 7 is a flow chart depicting operational steps for stabilizing marking process speed; and,
FIG. 8 is a block diagram of internal and external components of a computer system, in accordance with some embodiments of the present disclosure.

FIG. 7 shows flow chart 200 depicting operational steps for stabilizing marking process speed.

In step 202, process speed stabilization program 140 prints an image. For example, in printing system 10, process speed stabilization program 140 may print an image directly onto a sheet. In printing system 40, process speed stabilization program 140 may print or form an image or a patch directly onto surface 46. As previously described, the image may be a diagnostic image (see FIGS. 2A-B and 4A-B) or an image of the print job (see FIG. 5).

In step 204, process speed stabilization program 140 receives data related to the image. For example, in printing system 10, process speed stabilization program 140 receives an image of the printed image from sensor 20 (e.g., an IIM). In printing system 40, process speed stabilization program 140 receives an image of the printed image/patch from sensor 50 (e.g., a BTAC, an ETAC, or camera).

In step 206, process speed stabilization program 140 determines actual process speed and/or actual dimensions of the printed image. For example, using a diagnostic image having a plurality of lines arranged in parallel to process direction D1 (see FIGS. 2A and 4A), process speed stabilization program 140 determines the actual length of the lines. In another example, using a diagnostic image having a plurality of lines arranged in parallel to cross process direction D2 (see FIGS. 2B and 4B), process stabilization program 140 determines a spacing between such lines. In yet another example, using a diagnostic image having a plurality of lines arranged in parallel to cross process direction D2 (see FIGS. 2B and 4B), process stabilization program 140 determines a frequency with which the lines pass under the sensor in order to determine an actual process speed of the image/patch.

In step 208, process speed stabilization program 140 determines if the actual process speed and/or actual dimensions of the printed image are equal to the target process speed and/or actual dimensions of the printed image. If, in step 208, process speed stabilization program 140 determines that the actual process speed and/or actual dimensions of the printed image are equal to the target process speed and/or actual dimensions of the printed image, the program ends.

If, in step 208, process speed stabilization program 140 determines that the actual process speed and/or actual dimensions of the printed image are not equal to the target process speed and/or actual dimensions of the printed image, then in step 210, process speed stabilization program 140 adjusts the printing system. As previously described, this adjustment of printing system 10, 40 may include process speed stabilization program 140 communicating with engine controller 130 to increase or decrease the speed of drive roller 12, 42. Additionally or alternatively, the adjustment of printing system 10, 40 may include process speed stabilization program 140 communicating with print controller 120 to adjust print heads 18 (i.e., the amount of pixel-size actuations of the ejector in the printhead) or developer 48 (i.e., the duration the laser is on).

Figure 8:
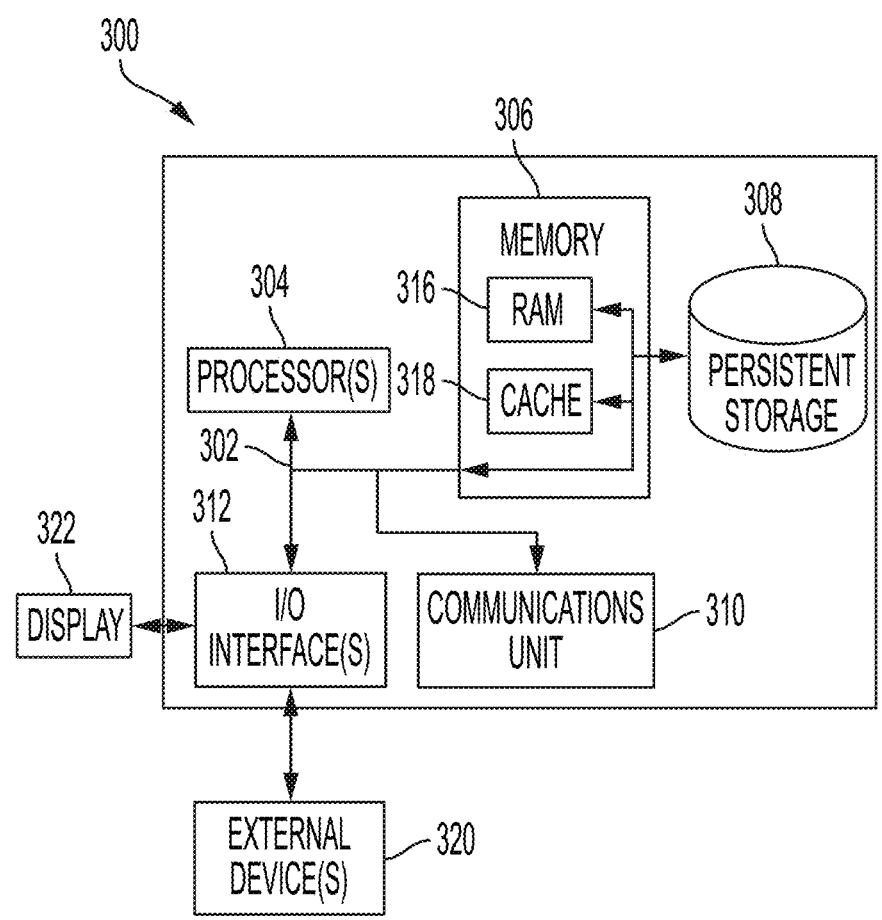

FIG. 8 is a block diagram of internal and external components of computer system 400, which is representative of the computing device of FIG. 6, in accordance with some embodiments of the present disclosure. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 300 includes communications fabric 302, which provides for communications between one or more processing units 304, memory 306, persistent storage 308, communications unit 310, and one or more input/output (I/O) interfaces 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310 provides for communications with other computer systems or devices via a network. In this exemplary embodiment, communications unit 310 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 300 through communications unit 310 (i.e., via the Internet, a local area network, or other wide area network). From communications unit 310, the software and data can be loaded onto persistent storage 308.

One or more I/O interfaces 312 allow for input and output of data with other devices that may be connected to computing device 300. For example, I/O interface 312 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 312 also connects to display 322.

Display 322 provides a mechanism to display data to a user and can be, for example, a computer monitor. Display 322 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Printing system
12 Drive roller
14 Roller
16 Vacuum transport belt
18 Print head(s)
20 Sensor or inline imaging module (IIM) sensor
22 Sheet
24 Sheet
26 Sheet
28 Image
30 Image
40 Printing system
42 Drive roller
44 Roller
46 Surface or belt or drum or photoreceptor belt an intermediate transfer belt (ITB)
48 Developer
50 Sensor or black toner area coverage (BTAC) sensor or electronic toner area coverage (ETAC) sensor or camera
52 Image transfer point
54 Sheet
56 Sheet
58 Patch
60 Patch
62 Image
64 Image
70 Image or printed sheet
72 Line
74 Line
76 Point
78 Point
100 Process speed stabilization environment
110 Network
120 Print controller
130 Engine controller
140 Process speed stabilization program
200 Flowchart
202 Step
204 Step
206 Step
208 Step
210 Step
300 Computing device
302 Communications fabric
304 Processing units
306 Memory
308 Persistent storage
310 Communications unit
312 Input/output (I/O) interfaces
316 Random access memory (RAM)
318 Cache memory
320 External device(s)
322 Display
D1 Process direction
D2 Cross process direction

What is claimed is:

1. A method of stabilizing a marking process speed in an inkjet or xerographic printing system, the inkjet or xerographic printing system including a surface from which marking material is transferred to print sheets, comprising:
    printing an image on the surface;
    receiving, from a sensor, data related to the image;
    determining, based on the data, at least one actual dimension of the image;

determining if the at least one actual dimension of the image is equal to a target dimension of the image; and,
if the at least one actual dimension is not equal to the target dimension, adjusting one or more components of the inkjet or xerographic printing system,
wherein the adjusting one or more components of the printing system comprises adjusting at least one of a speed of a drive roller, an actuator time of a print head, or a discharge time of a developer,
wherein the step of determining, based on the data, the at least one actual dimension of the image comprises:
locating at least two points in the image; and,
determining an actual distance between the at least two points in the image.

2. The method as recited in claim 1, wherein the step of printing the image on the surface comprises:
printing the image directly on a belt.

3. The method as recited in claim 1, wherein the step of printing the image on the surface comprises:
printing the image directly on a drum.

4. The method as recited in claim 1, wherein the step of printing the image on the surface comprises:
printing one or more lines on the surface.

5. The method as recited in claim 4, wherein the one or more lines are arranged parallel to a process direction of the printing system.

6. The method as recited in claim 4, wherein the one or more lines are arranged parallel to a cross process direction of the printing system, perpendicular to the process direction.

7. The method as recited in claim 4, wherein the step of determining, based on the data, the at least one actual dimension of the image comprises:
determining an actual distance between two points on one or more lines passing the sensor or an actual distance between two points on two or more lines.

8. The method as recited in claim 7, wherein the step of determining if the at least one actual dimension of the image is equal to the target dimension of the image comprises:
determining if the actual distance is equal to a target distance.

9. The method as recited in claim 4, wherein the step of determining, based on the data, the at least one actual dimension of the image comprises:
determining an actual length of the one or more lines passing the sensor.

10. The method as recited in claim 9, wherein the step of determining if the at least one actual dimension of the image is equal to the target dimension of the image comprises:
determining if the actual length is equal to a target length.

11. The method as recited in claim 1, wherein the sensor comprises at least one of a black toner area coverage (BTAC) sensor, an electronic toner area coverage (ETAC) sensor, or a camera.

12. The method as recited in claim 1, wherein the step of adjusting the one or more components of the inkjet or xerographic printing system comprises:
changing, by an engine controller, the speed of the drive roller.

13. The method as recited in claim 1, wherein the step of adjusting the one or more components of the inkjet or xerographic printing system comprises:
changing, by a print controller, the discharge time of the developer.

14. A method of stabilizing a marking process speed in an inkjet or xerographic printing system including a vacuum transport belt and at least one sheet onto which marking material is directly applied to print sheets, the method comprising:
printing an image on the sheet;
receiving, from a sensor, data related to the image;
determining, based on the data, at least one actual dimension of the image;
determining if the at least one actual dimension of the image is equal to a target dimension of the image; and,
if the at least one actual dimension is not equal to the target dimension, adjusting one or more components of the inkjet or xerographic printing system,
wherein the adjusting one or more components of the printing system comprises adjusting at least one of a speed of a drive roller, an actuator time of a print head, or a discharge time of a developer,
wherein the step of determining, based on the data, the at least one actual dimension of the image comprises:
locating at least two points in the image; and,
determining an actual distance between the at least two points in the image.

15. The method as recited in claim 14, wherein the step of printing the image on the sheet comprises:
printing one or more lines on the sheet.

16. The method as recited in claim 15, wherein the one or more lines are arranged parallel to a process direction of the printing system.

17. The method as recited in claim 15, wherein the one or more lines are arranged parallel to a cross process direction of the printing system, perpendicular to the process direction.

18. The method as recited in claim 15, wherein the step of determining, based on the data, the at least one actual dimension of the image comprises:
determining an actual distance between two points on one or more lines passing the sensor or an actual distance between two points on two or more lines.

19. The method as recited in claim 18, wherein the step of determining if the at least one actual dimension of the image is equal to the target dimension of the image comprises:
determining if the actual distance is equal to a target distance.

20. The method as recited in claim 15, wherein the step of determining, based on the data, the at least one actual dimension of the image comprises:
determining an actual length of the one or more lines passing the sensor.

21. The method as recited in claim 20, wherein the step of determining if the at least one actual dimension of the image is equal to the target dimension of the image comprises:
determining if the actual length is equal to a target length.

22. The method as recited in claim 14, wherein the sensor comprises an inline imaging module (IIM).

23. The method as recited in claim 14, wherein the step of adjusting the one or more components of the printing system comprises:
changing, by an engine controller, the speed of the drive roller.

24. The method as recited in claim 14, wherein the step of adjusting the one or more components of the printing system comprises:
changing, by a print controller, the actuator time of one or more print heads of the printing system.

* * * * *